US008954218B2

(12) United States Patent
Petersen et al.

(10) Patent No.: US 8,954,218 B2
(45) Date of Patent: Feb. 10, 2015

(54) METHOD AND APPARATUS FOR STREAMLINED REMOTE TELEMATICS AUTHORIZATION

(71) Applicant: Ford Global Technologies, LLC, Dearborn, MI (US)

(72) Inventors: Brian Petersen, Ferndale, MI (US); Kelly Lee Zechel, Plymouth, MI (US); Ritesh Pandya, Rochester Hills, MI (US); Michael Kruntovski, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 13/710,950

(22) Filed: Dec. 11, 2012

(65) Prior Publication Data

US 2014/0163811 A1    Jun. 12, 2014

(51) Int. Cl.
| | |
|---|---|
| *G01M 17/00* | (2006.01) |
| *G06F 19/00* | (2011.01) |
| *G06F 7/00* | (2006.01) |
| *G06F 11/22* | (2006.01) |
| *G07C 5/00* | (2006.01) |
| *G06F 17/00* | (2006.01) |

(52) U.S. Cl.
CPC ...................................... *G06F 17/00* (2013.01)
USPC .......................... 701/29.1; 701/32.6; 701/34.4

(58) Field of Classification Search
CPC .... G01R 31/005; G01R 31/006; G01R 31/02; G01M 17/007; G01M 99/005; G07C 5/00–5/12; G05B 19/4183; G05B 19/41805; G05B 2219/31175; G05B 2219/33192; G05B 2219/36371; G05B 2219/45018; G05B 2219/45051; G05B 2219/45055
USPC ......................................... 701/32, 32.6, 34.4
See application file for complete search history.

(56) References Cited

U.S. PATENT DOCUMENTS

| 5,935,180 | A | 8/1999 | Fieramosca et al. | |
|---|---|---|---|---|
| 5,950,149 | A * | 9/1999 | Fieramosca et al. | 702/183 |
| 7,295,945 | B2 | 11/2007 | Mok | |
| 2005/0090940 | A1 * | 4/2005 | Pajakowski et al. | 701/1 |
| 2012/0215713 | A1 | 8/2012 | Moore et al. | |
| 2012/0254948 | A1 * | 10/2012 | Kleve et al. | 726/4 |

* cited by examiner

*Primary Examiner* — Fadey Jabr
*Assistant Examiner* — Courtney Heinle
(74) *Attorney, Agent, or Firm* — Jennifer M. Stec; Brooks Kushman P.C.

(57) ABSTRACT

A vehicle system providing a temporary validation authorization request for one or more processors configured to transmit a signal from the vehicle system to a server once the one or more processors are installed in the vehicle. Once the server receives the installation signal, the processor may receive an in-vehicle authorization message from the server. The in-vehicle authorization message may be accepted by a user-input acceptance transmitted to the server. The system may determine temporary validation authorization if it is determined that the user accepted the in-vehicle authorization message within a predetermined amount of time following transmission of the signal to the server indicating that the processor was installed. Once authorized, the system may initialize to allow for assembly line testing. The temporary validation authorization initializes the vehicle system for temporary communication with the server while on a vehicle manufacturing assembly line for testing to ensure a quality product.

17 Claims, 5 Drawing Sheets

METHOD AND APPARATUS FOR STREAMLINED REMOTE TELEMATICS AUTHORIZATION

TECHNICAL FIELD

The present invention relates to the field of testing telematics and infotainment devices, and more particularly to methods and apparatuses for streamlined remote telematics authorization.

BACKGROUND

U.S. Pat. No. 7,295,945 generally discloses a method and system for testing assembled mobile devices. In accordance with one embodiment, there is provided a method for arranging test stages in a production line for the assembling and testing of wireless communications devices. The method comprises the steps of: determining a plurality of tests for testing an assembled wireless communication device, each test in the plurality of tests being one of an interactive test requiring physical actuation or mechanical dynamics to be performed on one or more interactive test components of the assembled wireless communication device, and a non-interactive test requiring no physical actuation or mechanical dynamics to be performed on the assembled wireless communication device; allocating each interactive test to an interactive test stage in the production line; and allocating each non-interactive test between the interactive test stage and a non-interactive test stage in the production line.

U.S. Patent Application 2012/0215713 generally discloses a vehicle having a controller and a controller interface configured to control the vehicle. The controller that is provided to operate the vehicle is also provided with software usable for quality assurance testing of various vehicle portions.

U.S. Pat. No. 5,935,180 generally discloses a system for testing the electrical components of vehicles during manufacturing includes a hand held tester to which a translator unit can be detachably engaged and with which the tester is in RF communication. The translator unit can be detached from the tester and plugged into a test receptacle under a vehicle's dashboard to communicate with the vehicle by translating computer formatted data from the tester to vehicle bus-formatted data, and vice-versa. Then, the vehicle's VIN is scanned into the tester or manually input into the tester, and the tester transmits the VIN via an RF link in the assembly plant to a computer in the plant. Based on the VIN, the computer determines the electric equipment that the vehicle has, and the computer transmits this information back to the tester. The tester then determines which tests to execute, and the tester causes the translator unit to undertake these tests. The translator transmits the test results back to the tester which in turn transmit the results to the computer. A portable current module can be provided that monitors the current drawn from the vehicle's battery during the testing and for communicating this data to the test via RF link.

SUMMARY

In a first illustrative embodiment, a vehicle system providing a temporary validation authorization request for one or more processors configured to transmit a signal from the vehicle system to a server once the one or more processors are installed in the vehicle. Once the server receives the installation signal, the processor may receive an in-vehicle authorization message from the server. The in-vehicle authorization message may be accepted by a user-input acceptance transmitted to the server. The system may determine temporary validation authorization if it is determined that the user accepted the in-vehicle authorization message within a predetermined amount of time following transmission of the signal to the server indicating that the processor was installed. Once authorized, the system may initialize to allow for assembly line testing. The temporary validation authorization initializes the vehicle system for temporary communication with the server while on a vehicle manufacturing assembly line for testing to ensure a quality product.

In a second illustrative embodiment, a computer-implemented method for providing temporary authorization to a vehicle computer system for testing. The computer-implement method includes installing at least a portion of a vehicle computer system in a vehicle. Once the vehicle computing system is installed, it may transmit a signal from the vehicle computer system to a server indicating that the computer system has been installed. The computer-implement method may transmit to the server a testing authorization request including an identification of the vehicle in which the vehicle computer system was installed. The server may determine whether the testing authorization request was received within a predetermined amount of time with respect to receipt of the signal indicating the computer system has been installed in the vehicle. If the request was received within the predetermined amount of time, the server may authorize a threshold of time to allow the temporary authorization for testing.

In a third illustrative embodiment, a non-transitory computer readable storage medium storing instructions executed by a processor to establish communication connection with a server for temporary authorization of a vehicle system. The computer readable storage medium when executed by a processor causes the processor to transmit vehicle identification to the server. The processor(s) are configured to receive an in-vehicle authorization message from the server. The in-vehicle authorization message may authorize override of standard processor initialization of a vehicle system based on a user-input accepting the in-vehicle authorization message. The processor is configured to transmit to the server an indication that the user has accepted the in-vehicle authorization message, and authorize temporary authorization for access of the vehicle system if it is determined that the user accepted the in-vehicle authorization message within a predetermined amount of time following transmission of the vehicle identification.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
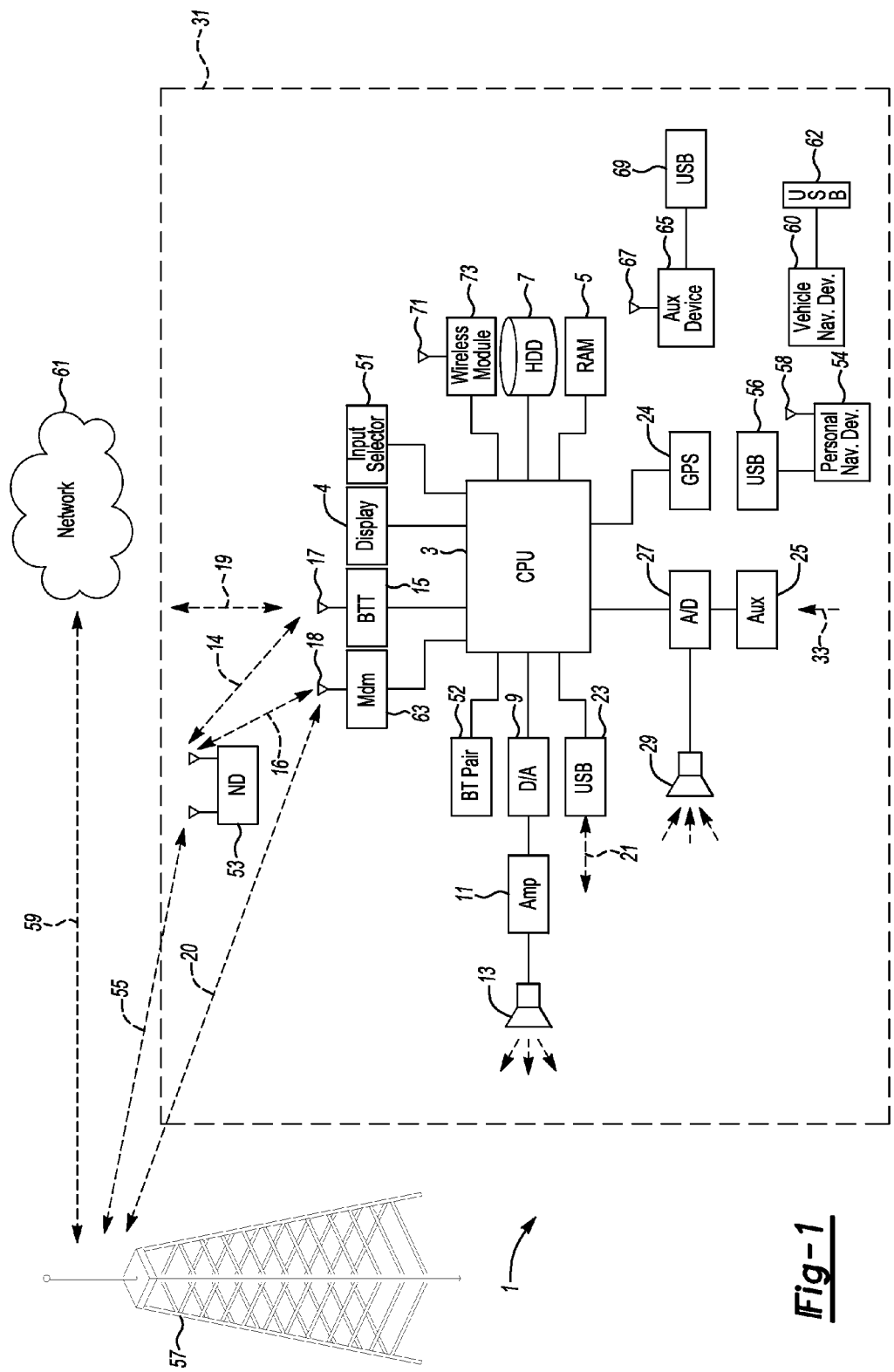
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
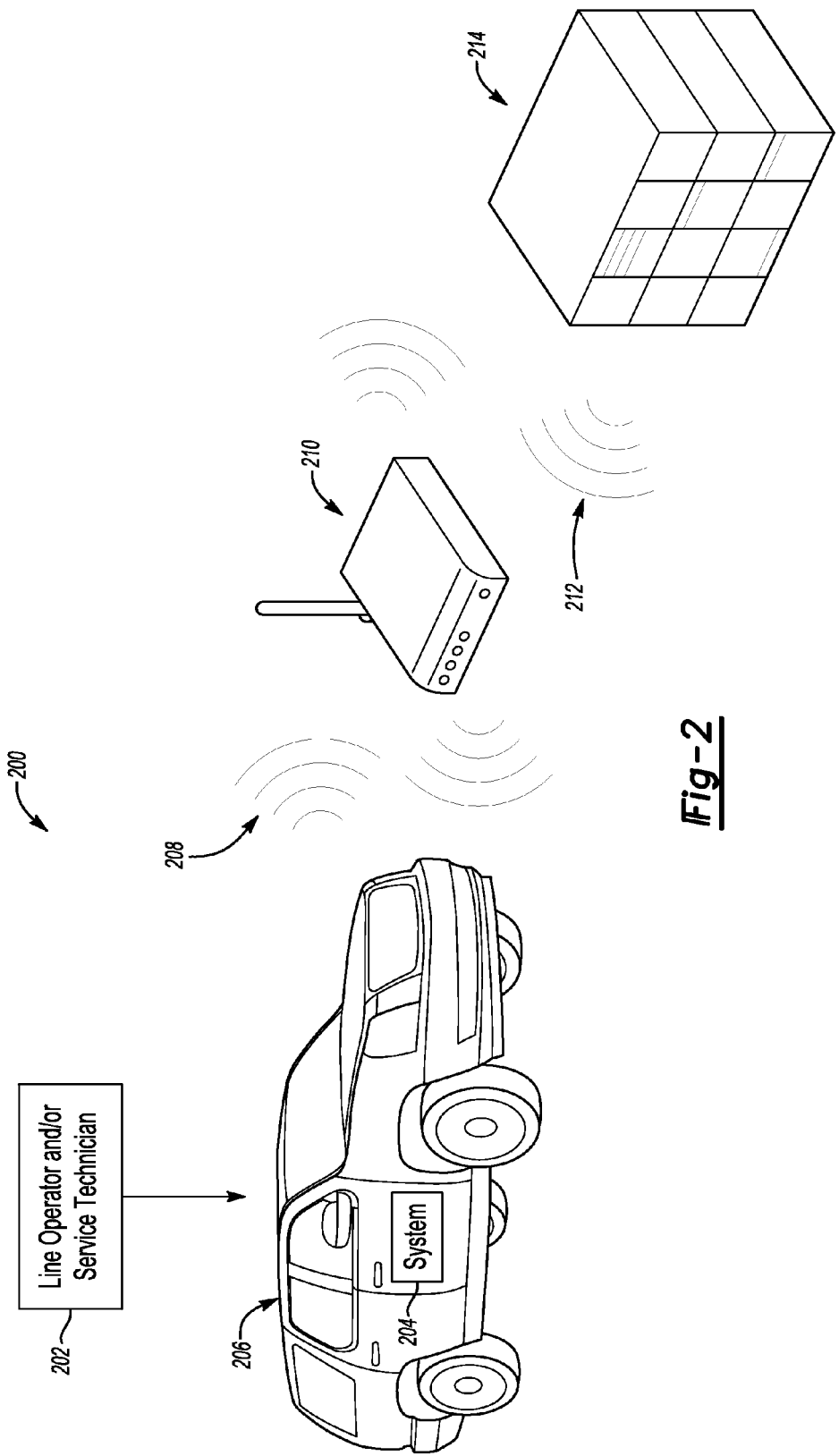
FIG. 2 is an illustrative example of an vehicle assembly line process showing portions of the validation process.

FIG. 2 is an illustrative example of a vehicle assembly process 200 that allows temporary authorization for installation and validation of a vehicle system 204 that may include, but is not limited to, infotainment, entertainment, climate, and/or navigation systems. When a vehicle 206 is being manufactured, many parts, components, and systems are validated before and after they are assembled within the final product. A vehicle computer system, which includes interaction with one or more vehicle systems 204, may be validated on the assembly line before and after multiple system installations into the vehicle 206 to ensure product quality.

An assembly line operator and/or service technician 202 may install a vehicle system 204 during assembly or service repair of a vehicle 206. Once the system is installed in the vehicle 206, the line operator and/or service technician 202 may need to validate that the system is operational within the vehicle. The installed system may include, but is not limited, a telematics system that requires communication with a service provider 214. The telematics system embedded with a transmitter allows communication with a receiver located at the server. The line operator and/or service technician may need to temporarily log in to the system for communication with the service provider 214 to ensure functionality of the system. The temporary log in process may include, but is not limited to, a wireless validation authorization signal transmitted to the server. Based on the received validation authorization signal, the server may request an additional in-vehicle user input to accept the validation authorization message. The user, including but is not limited to a line operator and/or service technician, may accept the in-vehicle validation authorization message allowing the vehicle system to initialize and communicate with all system features and functions for interactive testing. After the service technician and/or liner operator completes the testing process, the system may reset to factory settings and wait for a customer authorization request for consumer service.

In one illustrative embodiment, the manufacturing facility may allow the line operator to validate the system with the use of an assembly plant registration path to the service provider. The system in the vehicle may communicate with a wireless device 210, or a remote computing system connected through the wireless device, for communication to the service provider 214. The wireless device 210 may include, but is not limited to, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC that may be connected to the vehicle through SYNC or other Bluetooth pairing device. Once the vehicle system 204 has enabled communication 208, 212 with the service provider 214, the line operator and/or service technical can proceed with the validation process.

The vehicle system validation process may include, but is not limited to, features and functionality checks of the system. The line operator and/or service technician may want to ensure that the system operates correctly by following a checklist of basic initialization functions for configuration of the system. After the line operator and/or service technician is complete with validation and the system passes, the default settings may be reinitialized. The system communication with the service provider may disable temporary validation authorization, allowing the system to disable communication and wait for a customer to enter an authorization request.

Figure 3:
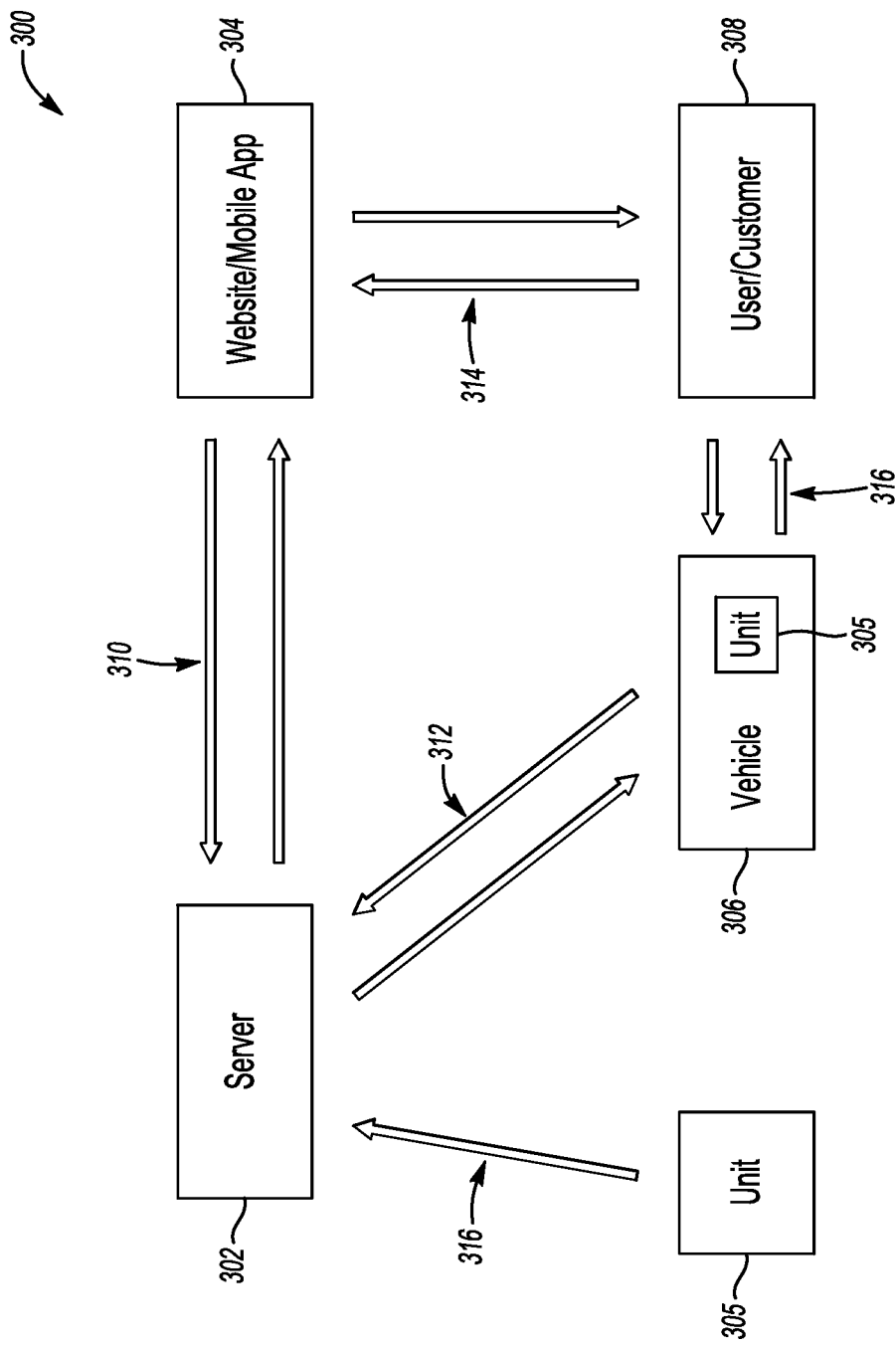
FIG. 3 is a block system architecture of a vehicle system initialized for validation during assembly and re-initialized for use by a customer.

FIG. 3 is a block system architecture of a vehicle system initialized for validation during assembly and re-initialized for use by a customer. During manufacturing of a vehicle, time is important, and holding a vehicle for an extended amount of time waiting for authorization to validate vehicle systems may cost the manufacturer a large amount of money. Many validation processes may be delayed for extended period of time, waiting on system initialization, authorization from a service provider, or on the approval from a vehicle computing system before the system authorizes access to the full complement of features that may need to be validated before being sold to consumers. The exemplary embodiment system architecture 300 provides the temporary enablement without authorization delay from the service provider 302 of a vehicle system for testing during assembly or service, and subsequently disabling the vehicle system once testing is complete.

During the assembly of a vehicle, one or more vehicle systems may be installed. To ensure reliability in the manufacturing process, the assembly line operators or user 308 may test the functions on every vehicle before it is released to the consumers. Vehicle systems that require interaction with a server 302 may include a two-step in-vehicle authorization process including, but not limited to registration at a website and/or mobile application 304 with subsequent in-vehicle verification by transmitting 312 an authorization message to the server.

An illustrative example is the installation of a telematics unit 305 during vehicle assembly at a manufacturing facility. The strategy and process given in this example may include, but is not limited to, other systems assembled onto a vehicle 306 that may need temporary access to the full complement of features for validation. The other systems may include, but not limited to, entertainment, infotainment, instrument clusters, seat, and/or powertrain systems.

The telematics unit 305 manufacturer transmits 316 a pre-shared key (known as PSK) and an integrated circuit card identifier (known as an ICCID) with the backed server 302 prior to assembly. After the telematics unit 305 is installed in the vehicle 306, it may transmit 312 a provisioning message to the server with the vehicle identification number, ICCID, and the PSK. The telematics unit transmitting an installation signal to the server allows for configuration between the two systems to take place. If the PSK matches on the server what was received by the telematics unit manufacturer, the vehicle may be added to the database and the telematics unit 305 is ready for initialization.

Once the vehicle 306 is assembled with the telematics unit 305, the user 308 adds the VIN via a website or mobile application 304. The website may communicate the registration of the VIN by transmitting a message 310 to the server 302. After registering the VIN, the user 308, in this example, is required to perform a user input authorization in-vehicle twice over a predefined period of time (e.g. twenty four hour period). The in-vehicle authorization may include, but is not limited to, acknowledging the registration by selecting a prompt on the telematics LCD touchscreen display and having that authorization being transmitted 312 to the server 302.

Following installation of the telematics unit 305, the VIN may be entered via the website and/or mobile application 304 and transmitted message 310 to the server 302. The server 302 may assess and compare the VIN sent by website and/or mobile application 304 to when the VIN was added to the database during the telematics installation at vehicle assembly. If the VIN transmitted by the website and/or mobile application to the server is within a predefined number of days of when the VIN was added to the database on the server, then the server may allow full functionality of the telematics unit for validation. The server may determine if the VIN was added to the database within a predefined number of days, then the VIN being added is for in-plant validation. In this condition, the server 302 may only transmit 312 the final authorization signal to the vehicle 306. The vehicle system may receive the final authorization signal from the server and output a validation authorization message presented on the LCD touchscreen in the vehicle. The in-vehicle authorization message acceptance may allow the user 308 full system access by selecting "ok" on the LCD touchscreen for authorization.

After assembly, the vehicle 306 is shipped and put into possession of a customer 308. The customer may be identified as someone who adds a VIN later than a predefined amount of days after the initial provisioning message sent during installation of the telematics unit during vehicle assembly. The customer 308 may add the VIN at the website or mobile application 304.

To address the issue of the customer 308 potentially buying a car with an active telematics unit 305, the server 302 may transmit 312 a factory reset message to the vehicle system at a predefined number of days after full access is granted to the in-vehicle system. The factory reset predefined number of days may be approximately a percentage of the expected build date-to-dealership-arrival time. For example, if it would take thirty days to deliver a car from the manufacture facility to a dealership, the factory reset predefined number of days may equal fifteen days.

Figure 4:
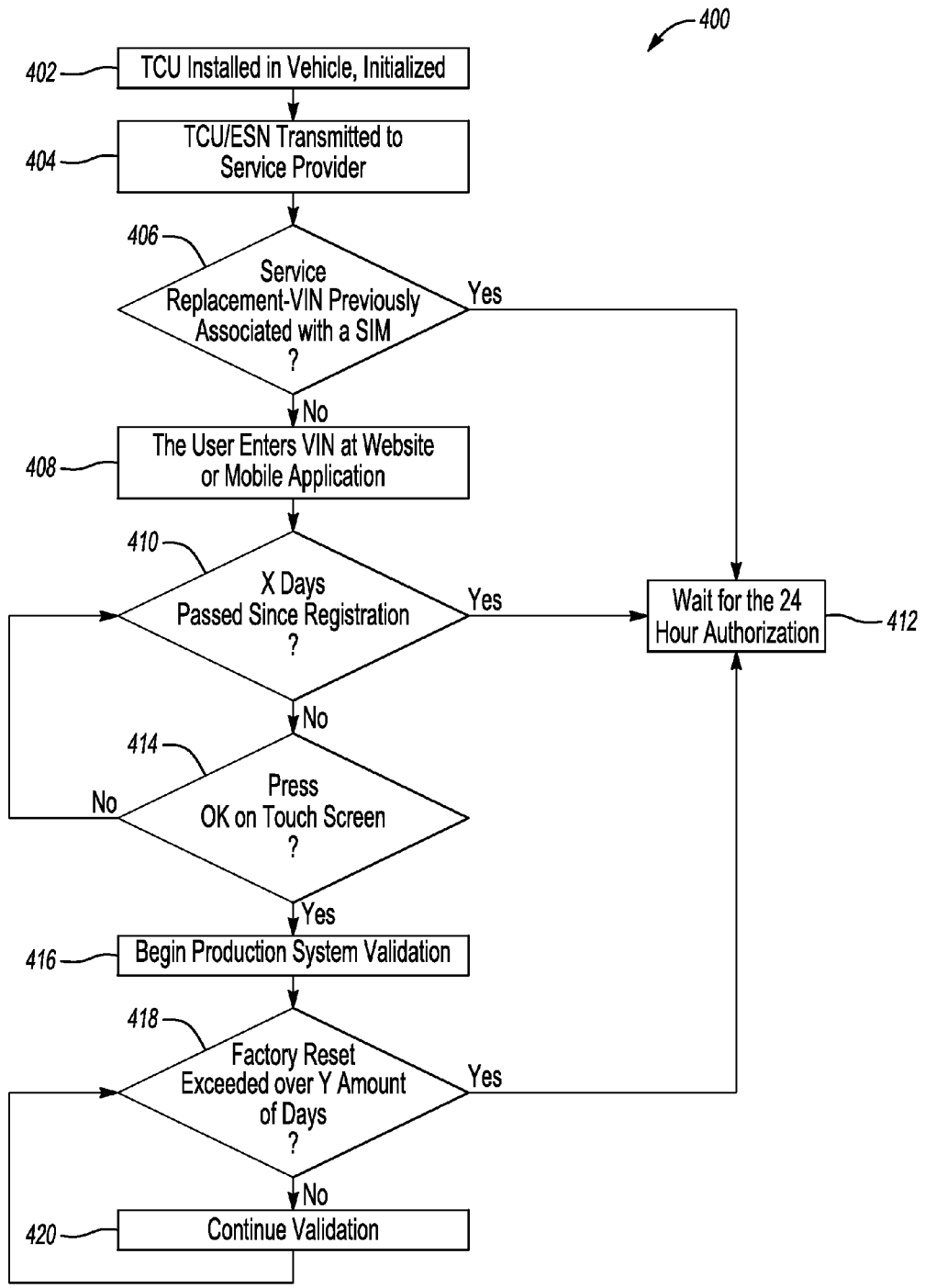
FIG. 4 is a flow chart illustrating an illustrative method of a system registration streamlining a vehicle assembly process during manufacturing.

FIG. 4 is a flow chart illustrating an example method of a system registration streamlining a vehicle assembly process during manufacturing. The process includes a vehicle system registration that allows a full complement of features that may need to be validated once installed into the vehicle during manufacturing or service. The process to allow authorization to validate the vehicle system during installation may be applied, but not limited to, infotainment systems, entertainment systems, ABS systems, powertrain systems, and other vehicle systems that may require authorization to enable the full complement of features.

At step 402, the telematics control unit (TCU) is installed into a vehicle during vehicle assembly or service/replacement of a previous unit, and initialized. The TCU manufacture shares a pre-shared key (PSK) and an integrated circuit card identifier ICCID with the backed server prior to assembly/installation into a vehicle. At step 404, the TCU transmits a standard system initialization including the electronic serial number (ESN), the vehicle identification number (VIN), PSK match, and ICCID match. If the PSK and/or ICCID match on the server, the VIN is added to the database and is ready for system authorization.

At step 406, if the TCU is being replaced during a service repair, the VIN may be previously associated with a subscriber identity module (SIM). If the TCU is a service replacement, the VIN may be associated already with the previous TCU, therefore the system may require a twenty-four hour authorization process at step 412. The twenty-four hour authorization process may require a user to add the VIN via a website or mobile application, and the user may be required to authorize activation within the vehicle on the TCU twice over a twenty-four hour period.

At step 408, after the TCU has requested and received default parameters from the vehicle, the user (i.e. line assembly worker or service technician) may enter the VIN at a website or mobile application. Once the VIN is entered at the website or mobile application, the server may check to see if the VIN was entered within a predefined number of hours of the ESN being transmitted to the server at step 410. Having the user enter the VIN at the website or mobile application for registration within a predefined number of hours may allow the server to know that the VIN is being added by a user for in-plant temporary use to validate system or by a service technician to test the newly installed system. If the VIN entered at the website or mobile application exceeds the predefined number of hours from when the TCU transmitted the ESN to the server, the system may require a twenty-four hour authorization process at step 412.

At step 414, if the VIN entered at the website or mobile application is within the predefined number of hours from when the TCU transmitted the ESN to the server, then the server may send a temporary validation signal to the TCU for in-vehicle authorization. The vehicle system may receive the temporary validation signal and output a validation authorization message to the in-vehicle display. The in-vehicle authorization may be transmitted to the server with a user acceptance by selecting an "OK" message on the TCU touchscreen. By contrast, a customer would be identified as someone who enters a VIN at a website or mobile application later than the predefined amount of hours after the TCU transmitted the ESN to the server. If, at any point of the process, the server receives a "DENY" response to the in-vehicle authorization request, the vehicle is removed from that user's account. The system may allow access to all features and functions for the user to validate once the server receives the transmitted "OK" message has been hit on the TCU touchscreen and the server received the message within the predefined number of hours. Once the predefined number of hours is exceeded, or the user denies the in-vehicle request, the twenty-four hour authorization process may be required.

At step 416, the vehicle system registration process may allow immediate access to all the features of the TCU for validation. The user may begin validation of all the features and functions ensuring quality of the product before being delivered to a customer. Validation may include, but is not limited to, user interaction with the TCU, communication with the server, and other features that integrate with the VCS.

At step 418, the vehicle system registration process may ensure that the TCU resets to factory settings after a calibrated amount of time. The factory reset calibrated amount of time is set to prevent continuous authorization of communication with the TCU and the server for an extended period of time. The calibrated amount of time allows the user to begin validating the TCU within an allocated amount of time, while ensuring that the TCU is reset to factory settings before being delivered to the customer. For example, once the user authorizes the in-vehicle authorization message, the user may have a calibrated amount of time to perform the validation. Another example of how the calibrated amount of time may be calculated is from a percentage of the expected build date-to-dealership-arrival time. For example, if it would take thirty days to deliver a car from the manufacture facility to a dealership, the factory reset calibrated amount of time may equal fifteen days. Once the factory reset calibrated amount of time is exceeded, the TCU may be reset to factory settings, and the next user may have to perform the twenty-four hour authorization process.

Figure 5:
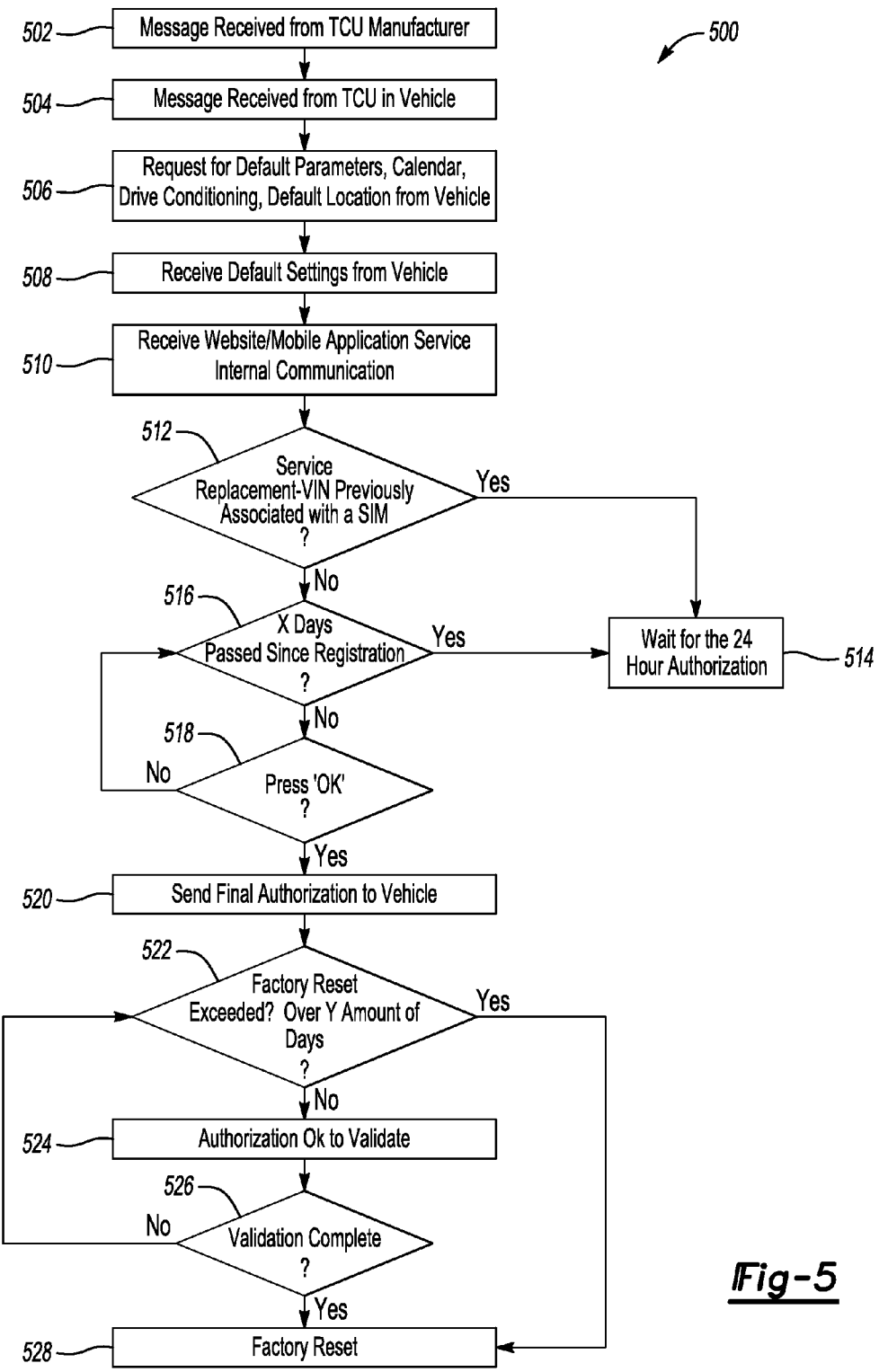
FIG. 5 is a flow chart illustrating an exemplary method of a service provider communication with a system registration streamlining a vehicle assembly process during manufacturing.

FIG. 5 is a flow chart illustrating an example method of a service provider 500 in communication with a system registration for streamlining a vehicle assembly process during manufacturing. The server may receive messages sent from the TCU to determine authorization based on several factors, including, but not limited to VIN, ESN, PSK, and ICCID. The server may determine authorization, validation, and factory resets based on predefined calibrations.

At step 502, the TCU manufacturer may send to the service provider a ESN, PSK, and/or ICCID for identification before shipping the unit to the assembly plant for installation into a vehicle. At step 504, once installed into the vehicle during assemble, the TCU may send a message to the service provider with the respective VIN and the associated ESN, PSK, and/or ICCID. The service provider may store and associate the VIN with the respective ESN, PSK, and/or ICCID within the database.

At step 506, after receiving the respective VIN with the associated TCU, the service provider may request the vehicle default parameters including, but not limited to, calendar defaults, driver condition defaults, default location, and peak time default. The service provider may receive the default setting from the vehicle at step 508.

At step 510, once the user submits the VIN at the website or mobile application, the service provider may receive the information from the website/mobile device. The service provider may compare the VIN with the TCU and ensure that the unit has not been previously associated with another SIM at step 512. If the VIN has been previously associated with another SIM, then the service provider may require the twenty-four hour authorization process at step 514.

At step 516, after the VIN has been received by the service provider, and compared to determine that no other SIM is associated with that VIN, the server may evaluate the to see if the VIN was received within a predefined number of days of the ESN being transmitted to the service provider. If the VIN has been received within the predefined number of days of the ESN being transmitted to the service provider, the server may transmit an in-vehicle authorization message to the TCU at step 518. If the VIN has not been received within the predefined number of days of the ESN being transmitted to the service provider, then the service provider may require the twenty-four hour authorization process at step 514.

At step 518, once the user selects the "OK" message on the TCU unit, the service provider may receive this acceptance and allow access to all features and functions for the user to validate. The service provider may send a final authorization to the vehicle to allow the full access of the TCU at step 520. The service provider may monitor if the "OK" message has not been accepted within the predefined number of days of when the ESN was transmitted to the service provider. The service provider may also implement the twenty-four hour authorization process if the user selects the "DENY" message on the TCU touchscreen, denying the in-vehicle authorization.

At step 522, the service provider may monitor to ensure that the TCU resets to factory settings if the validation has not been complete after a calibrated amount of time. The factory reset calibrated amount of time is set to prevent continuous authorization of communication with the TCU and the server for an extended period of time. The calibrated amount of time allows the user to begin validating the TCU within an allocated amount of time, while ensuring that the TCU is reset to factory settings before being delivered to the customer. For example, once the user authorizes the in-vehicle authorization message, the user may have a calibrated amount of time to perform the validation. Another example of how the calibrated amount of time may be calculated is from a percentage of the expected build date-to-dealership-arrival time. For example, if it would take thirty days to deliver a car from the manufacture facility to a dealership, the factory reset calibrated amount of time may equal fifteen days. Once the factory reset calibrated amount of time is exceeded, the TCU may be reset to factory settings, and the next user may have to perform the twenty-four hour authorization process.

At step 524, the service provider may communicate within the predefined amount of time to allow validation to be completed. The service provider may continuously monitor to determine if the validation is complete at step 526. If the validation is not complete, the service provider may check if the calibrated amount of time has been exceeded or if the user can continue to validate the TCU.

At step 528, after validation is complete, and/or the calibrated amount of time has been exceeded, the service provider may send a disable system validation authorization message to the TCU to reset its parameters and setting to the factory reset conditions. The TCU may now be ready for delivery. The server may recognize the customer based on the exceeded calibration amount of time since the ESN was transmitted and enable the twenty-four hour authorization process. Designing a system that permits the TCU to temporary communicate with the service provider allows the vehicle assembly manufacturer to ensure a quality product for the customer while streamlining their production process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a processor configured to:
transmit an installation signal, indicating that the processor is installed in the vehicle, from a transmitter to a receiver in communication with a server;
receive a wireless validation authorization signal from the server;
output a validation authorization prompt at the vehicle;
receive user input at the vehicle accepting the validation authorization prompt;
transmit to the server, indication that a user has accepted the validation authorization prompt;
receive a temporary validation from the server indicating that user acceptance of the validation authorization prompt was recognized at the server within a first predetermined amount of time, wherein the first predetermined amount of time is up to and including 15 days from the server's receipt of the installation signal; and
enable vehicle system validation authorization upon receipt of the temporary validation.

2. The vehicle system of claim 1 wherein the processor is additionally configured to disable system validation authorization once vehicle system validation is complete.

3. The vehicle system of claim 2 wherein disabling system validation authorization includes a reset of the processor to factory settings.

4. The vehicle system of claim 1 wherein the processor is additionally configured to disable system validation authorization after a second predetermined amount of time.

5. The vehicle system of claim 4 wherein the second predetermined amount of time is set to 96 hours.

6. The vehicle system of claim 1 wherein the first predetermined amount of time is 12 hours.

7. The vehicle system of claim 1 wherein the transmitter is a Bluetooth transmitter.

8. The vehicle system of claim 1 wherein the validation authorization prompt is displayed on a LCD touchscreen.

9. A method comprising:
transmitting a wireless installation signal, indicating that a vehicle computer system has been installed in a vehicle, from the vehicle computer system to a server;
transmitting a validation authorization request to the server, including an identification of the vehicle in which the vehicle computer system was installed;
determining at the server whether the validation authorization request was received within a first predetermined amount of time wherein the first predetermined amount of time is up to and including 15 days with respect to receipt of the installation signal; and
receiving the request within the first predetermined amount of time, and in response authorizing a second predetermined amount of time during which the server is permitted to send an in-vehicle authorization prompt to the vehicle computer system and receive an authorization prompt acceptance from the vehicle computing system to allow temporary authorization for validation.

10. The method of claim 9 additionally comprising disabling of the temporary authorization for validation when the second predetermined amount of time allowed for the temporary authorization has expired.

11. The method of claim 10 wherein the disabling includes disconnecting communication to the server and reinitializing the vehicle computer system.

12. A non-transitory computer readable storage medium, storing instructions that, when executed by a processor, configure the processor to:
establish communication connection with a server for temporary authorization of a vehicle system;
transmit vehicle identification;
receive a wireless validation authorization signal, authorizing override of standard system initialization;
output a validation authorization prompt at the vehicle;
receive user input accepting the validation authorization prompt;
transmit to server an indication that the user has accepted the validation authorization prompt; and
temporarily authorize access to the vehicle system, in response to determining that the user accepted the validation authorization prompt within a predetermined amount of time wherein the predetermined amount of time is up to and including 15 days following transmission of the vehicle identification.

13. The non-transitory computer readable storage medium of claim 12 wherein the processor is caused to receive a factory reset message to reinitialize the vehicle system.

14. The non-transitory computer readable storage medium of claim 12 wherein the processor is caused to disable communication with the server after validation is complete.

15. The non-transitory computer readable storage medium of claim 12 wherein the vehicle identification includes an electronic serial number.

16. The non-transitory computer readable storage medium of claim 12 wherein the vehicle identification includes a pre-shared key.

17. The non-transitory computer readable storage medium of claim 12 wherein the vehicle identification includes an integrated circuit card identifier.

* * * * *